May 11, 1943.   A. R. THOMPSON   2,318,904
CUTTING MACHINE
Filed Sept. 23, 1939   3 Sheets-Sheet 1
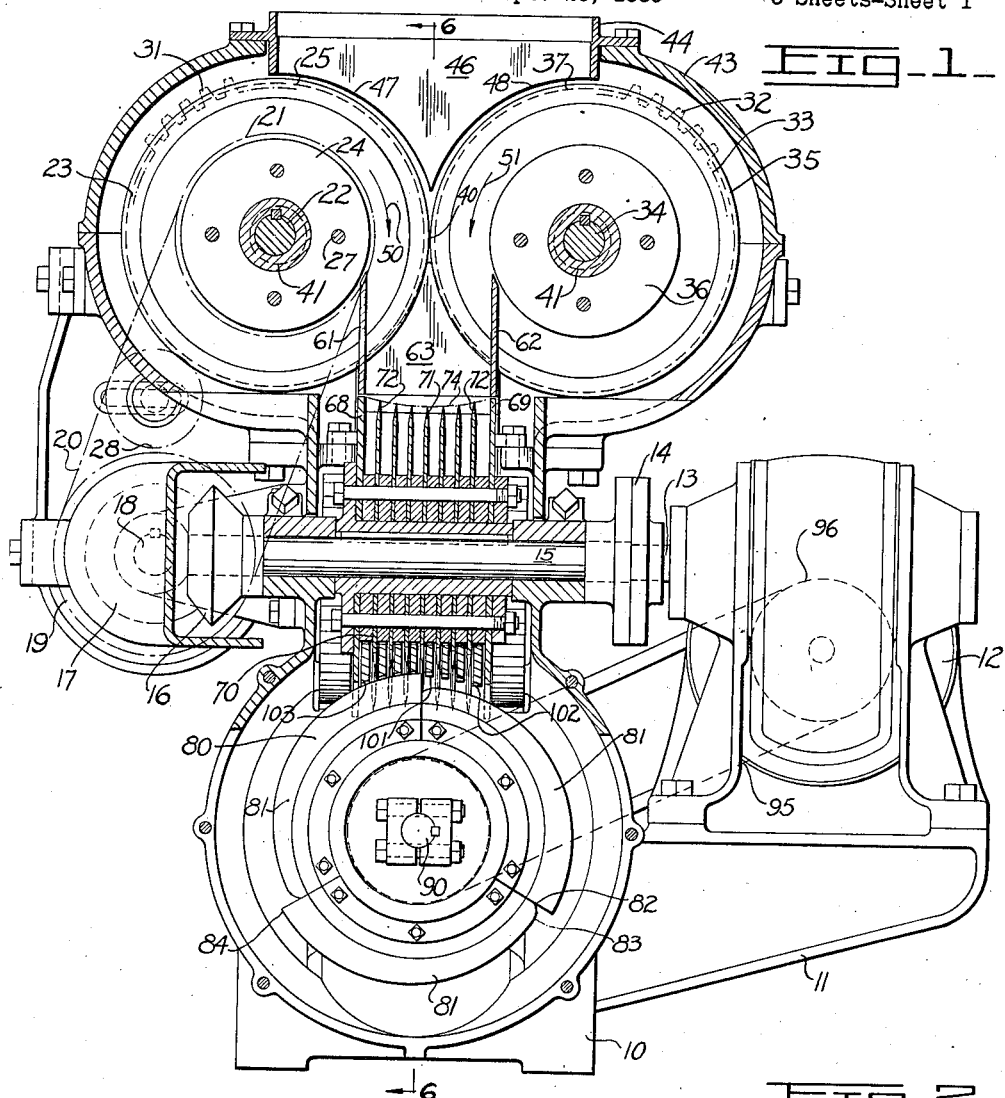
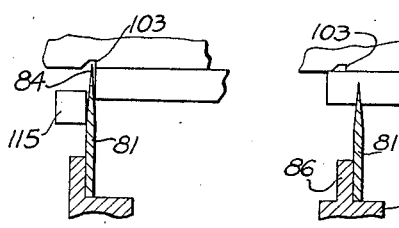
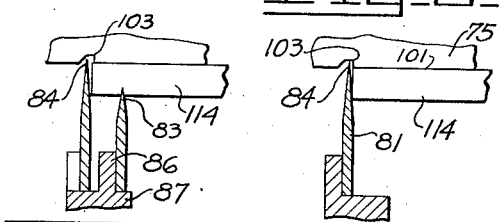
INVENTOR.
ALBERT R. THOMPSON
BY
Philip A. Minnis
ATTORNEY.

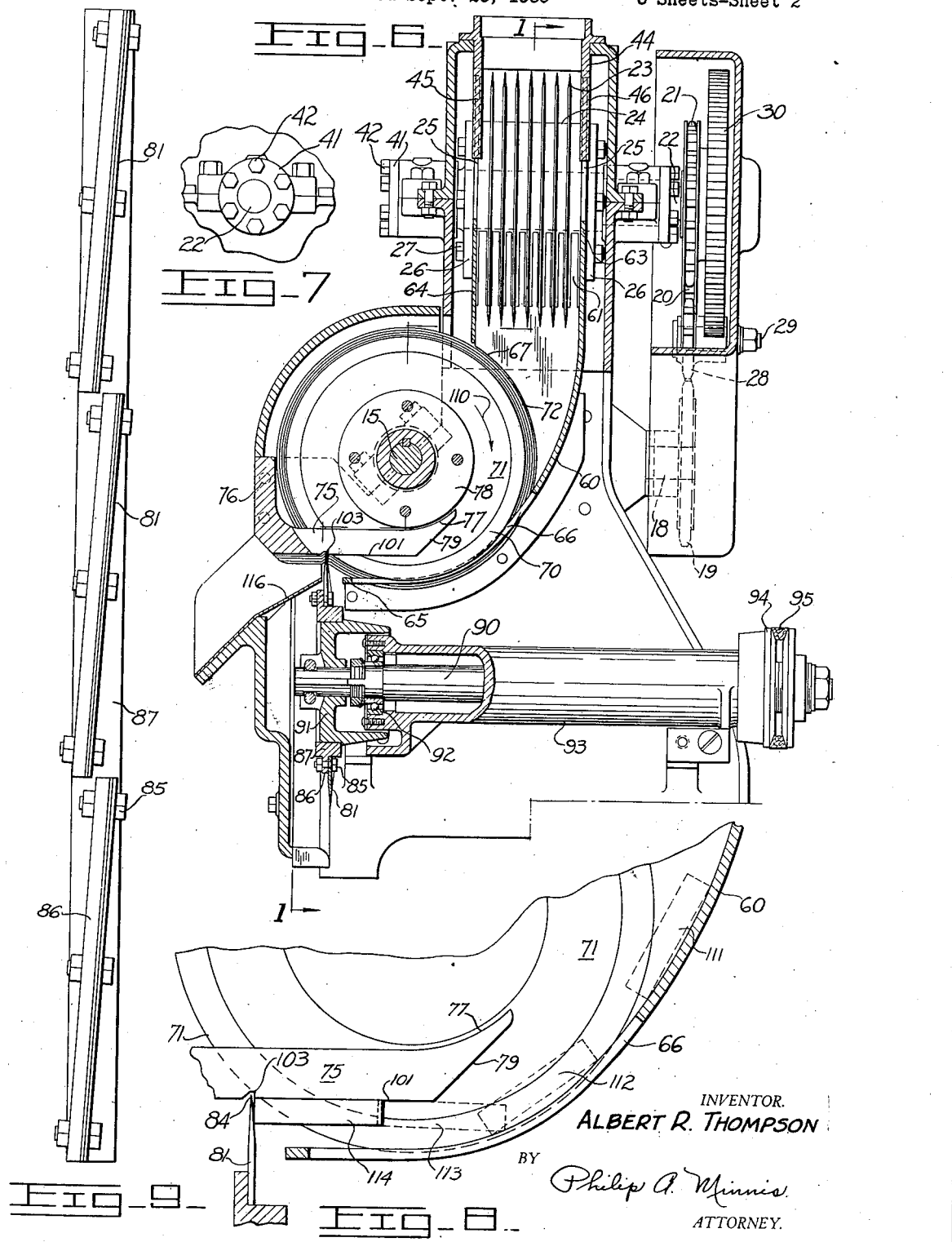

May 11, 1943.  A. R. THOMPSON  2,318,904
CUTTING MACHINE
Filed Sept. 23, 1939   3 Sheets-Sheet 3
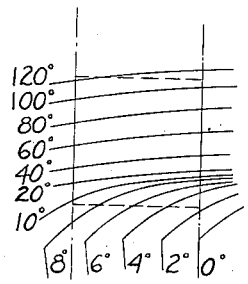
Fig_11_
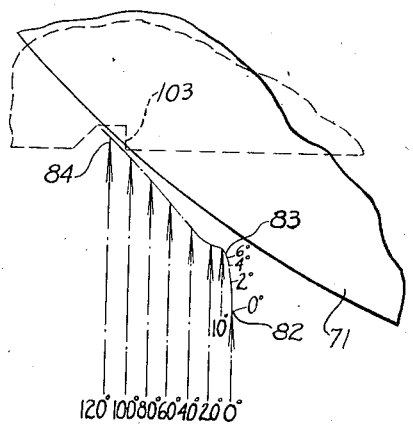
Fig_10_
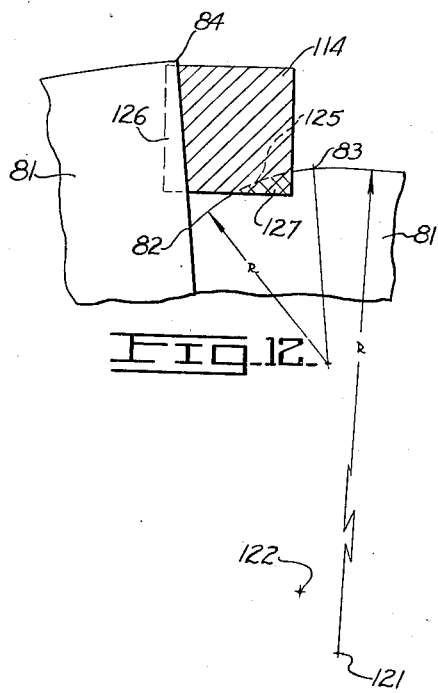
Fig_12_
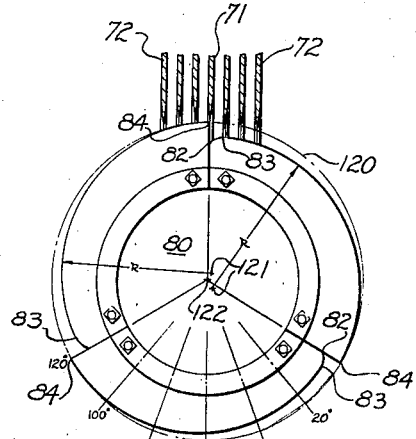
Fig_13_
INVENTOR.
ALBERT R. THOMPSON
BY Philip A. Minnis
ATTORNEY Patented May 11, 1943

2,318,904

UNITED STATES PATENT OFFICE 2,318,904

CUTTING MACHINE

Albert R. Thompson, Los Gatos, Calif., assignor to Food Machinery Corporation, San Jose, Calif., a corporation of Delaware Application September 23, 1939, Serial No. 296,256

24 Claims. (Cl. 146—78)

This invention relates in general to cutting machines and especially to machines for cutting food materials, such as fruits and vegetables, into pieces of uniform size and cubical shape.

A machine of this kind is useful in the canning industry where various fruits and vegetables are sometimes diced before being placed in the can. One of the prime requisites of a machine that is to be used in the canning industry is dependability of operation. Fruits and vegetables, being perishable, must be prepared for canning without delay, and the machine must work almost continuously at top speed and without interruption until its work has been completed.

It is therefore an object of this invention to provide a dicing machine which is simple in construction, in the sense that the use of parts or mechanisms which by experience have proved to be sources of trouble due to wearing and sensitivity of adjustment, has been avoided; and also with this simplicity of construction it has been an object of the invention to provide a rugged construction—a construction so rugged, for example, that if, by accident, a foreign particle such as a peach pit, should be introduced into the machine, the machine would not be disabled, because none of the parts would be so fragile or intricate as to be put out of operation.

A further object of the invention is to provide a machine in which the feeding of the materials through the machine is accomplished solely by gravity and the movement of the cutters, so that all extraneous feeding mechanism such as conveyors could be dispensed with.

Another object of the invention is to provide a machine which has a definite and positive control over the material from the time it is fed in until the time it is discharged.

Still another object of the invention is to provide a dicing machine which has a high capacity due to the fact that it can be operated at high speed without injuring or wasting the food material being handled.

Other objects of the invention will appear from the disclosure of a machine in which the invention has been embodied.

In the drawings:

Fig. 1 is a sectional view of the machine taken in various planes as indicated by the arrows 1—1 in Fig. 6.

Figs. 2 to 5 are diagrams illustrating the manner in which the cube cutter feeds the material out of the machine as it cuts off the cubes.

Fig. 6 is a vertical section of the machine taken in the direction of the arrows 6—6 in Fig. 1.

Fig. 7 is a fragmentary elevation of one of the eccentric bearings for the shaft of a gang of slabbing knives.

Fig. 8 is an enlargement of a portion of the mechanism shown in Fig. 6.

Fig. 9 is a development of the cube cutter.

Fig. 10 is an enlargement of a fragment of the slicing gang showing diagrammatically the co-operation of the cube-cutter therewith.

Fig. 11 is a diagram to show the progress of the cutting edge of the cube-cutter in passing through a strip of material.

Fig. 12 is a fragmentary view of the knive of the cube-cutter.

Fig. 13 is a front elevation of the cube-cutter to show the cooperation of its knives with the knives in the slicing gang.

The machine is provided with a suitable frame 10 (Fig. 1) which serves also as a housing for the moving parts. The frame includes a bracket 11 which extends out to one side. Motor 12 is mounted on the bracket 11 and has a laterally extending worm-driven shaft 13 connected by a flanged coupling 14 to a shaft 15 having at its opposite end a bevel gear 16 meshing with bevel gear 17 on shaft 18. On the other end of shaft 18 is a sprocket wheel 19 which can be seen in Fig. 6. Sprocket 19 is connected by chain 20 to a sprocket 21. An idler 28 is mounted on a shaft 29 which is adjustably mounted in a slot in the frame for tightening the chain 20. The sprocket 21 is keyed to a shaft 22 upon which are mounted a plurality of circular cutting knives 23 having their peripheries ground to a tapered cutting edge. Circular knives 23 are of uniform diameter and are equally spaced apart on the shaft 22 by means of spacer discs 24. Adjacent the two end spacer discs 24 are closure discs 25. The purpose of the closure discs 25 is to prevent escape of the material axially of the shaft as will appear later. The circular knives 23, the spacer discs 24, and the closure discs 25 are assembled on the shaft 22 and held together as a unit by means of heads 26 and bolts 27.

Adjacent the sprocket 21 (Fig. 6) is a gear wheel 30, which has long teeth 31 (Fig. 1) around its periphery which mesh with corresponding teeth 32 on a similar gear wheel 33 on a shaft 34. The shaft 34 carries a gang of circular knives 35 separated by spacers 36 and provided with closure discs 37 similar in every respect to the corresponding parts on the shaft 22. The two gangs of circular knives 23 and 35 are positioned with respect to each other so that at the point 49 in Fig. 1 the cutting edges do not overlap but are opposed edge to edge, each knife 23 lying in the same vertical plane as the knife 35 with which it cooperates. These opposed cutting edges are maintained in proximity, and in order to maintain them so, as their diameters diminish from sharpening, the shafts 22 and 34 are mounted in eccentric bearings 41 which can be rotatably adjusted.

Each end of each shaft is mounted in one of these eccentric bearings, but since the bearings are similar only one will be described. Fig. 7 is an end elevation wherein it can be seen that shaft 22 is eccentric with respect to bearing 41, which is flanged to receive screws 42 which are threaded into the framework of the machine. As the diameter of knives 23, 35 decrease due to wear and sharpening, the edge-to-edge adjustment of their cutting edges is restored by rotating the eccentric bearings 41, thus moving the shafts 22 and 34 nearer together, until the desired clearance is obtained at 40 (Fig. 1). The bearings 41 are then secured in place by means of the screws 42 so that the relative positions of the shafts are maintained. In addition to the provision of the eccentric bearings, the gear teeth 31, 32 are cut long and the drive to shaft 22 is by means of chain 20, the tension of which can be adjusted by idler 28, in order to permit this adjustment of the knife edges. I have found that with rotary knives running edge to edge, instead of overlapping, ruggedness and efficiency are increased. Foreign particles, such as pits, do less injury to the knives when they are placed edge to edge in the same plane because the pit is unable to break or bend the knife edge by getting between the knives and wedging them apart laterally. When the pit enters between the knives the pressures on the knives are all in the same plane and the strains run radially in toward the knife centers where the blades are firmly backed up by the spacer discs. The result is that if a pit gets between the knives they are able to cut it and the pit does not throw the knives out of adjustment or break them.

The two gangs of knives 23, 35 (Fig. 1) are located in a portion of the frame which serves as a hopper 43, the top of which is apertured to receive the guide chute 44 having two depending side portions which appear in section at 45 and 46 in Fig. 6. The side portions 45, 46 lie in the same respective planes as closure discs 25. As can be seen in Fig. 1, the side portion 46 of the chute 44 has an arcuate boundary 47 for close cooperation with the closure disc 25 on shaft 22 and a similar arcuate boundary 48 which cooperates with the closure disc 37 on shaft 34. Similarly, side 45 is formed to fit the closure discs. The gang of cutting knives 23 is rotated in the direction of the arrow 50, and the gang of knives 35 rotates in the direction of arrow 51, so that when the material is introduced into the hopper the gangs of knives draw the material down between them and cut it into slabs. Accordingly, these knives will hereinafter be referred to as slabbing knives.

The slabs of material will now be cut into slices by cutting them along parallel planes perpendicular to the plane of the slab cut. After the slabs of material have been cut by the knives 23, 35, they tend to drop vertically from the point 40, both from the force of gravity and the combined feeding action of the knives. If a slab should tend to be carried around in one of the gangs, it encounters one of the strippers 61 or 62 (Fig. 1) which rise vertically between the knives and terminate adjacent the periphery of spacer discs 24 and 36, respectively. The series of strippers 61 can be seen in Fig. 6. The strippers 61, 62 (Fig. 1) form the side closures of a vertical chute which guides the slabs downward. This chute has end closures 63, 64 (Fig. 6) which lie in the same plane as closure discs 25, and which have arcuate boundaries (Fig. 1) for cooperation with the closure discs in each gang in order to assure that all of the material that is put in the hopper is discharged from the slabbing knives into the chute. By referring to Fig. 6, it can be seen that this chute is in effect a continuation of the chute 44 so that the slabbing knives are located in a chute, the material being deposited in the upper end and being slabbed as it descends vertically under the influence of gravity and the action of the knives themselves.

The lower end of this chute is a vertical extension of a trough 60, which has a curved bottom terminating at 65 in substantially a horizontal plane. The bottom of the trough is provided with a series of slots 66 into which the cutting edges of a gang of slicing knives 70 extend. The side walls of the trough have arcuate boundaries, as indicated at 67 (Fig. 6), which fit against closure discs 68, 69 (Fig. 1) of the gang of slicing knives 70.

The gang of slicing knives 70 is mounted on shaft 15 and the construction thereof is similar to that of the gang of slabbing knives 23, except that the knives are not all of the same diameter. As can be seen in Fig. 1, the diameters of the slicing knives are varied so that the center knife 71 is of the least diameter and the end knives 72 are of greatest diameter, and the diameters of the intermediate knives are graduated so that in any section of the gang, such as that shown in Fig. 13, the cutting edges of the knives terminate in an arc indicated by the dotted line 74 (Fig. 1). This gives the gang a concave periphery which is provided for the reception of the cube-cutter 80.

This concave periphery is formed as though the cube cutter were a milling cutter which had actually milled an arcuate groove in the periphery of the gang of slicing knives. The purpose of it is to cause the periphery of the slicing gang to conform to the periphery of the cube cutter so that the cube cutter will fit into the slicing gang and will cut cubes from the strips of material the instant the strips emerge from the slicing gang and while the strips are still held wedged between the knives of the gang.

The cube cutter is mounted on a shaft 90 (Fig. 1) and consists of three similar knives 81, having a special contour for a purpose which will be explained later. Each knife 81 (Figs. 12 and 13) has a low point 82 connected by a short radius curve to a point 83 which is connected by a long-radius curve to the high point 84. As the shaft 90 rotates, the high points 84 describe the circle 120, (Fig. 13) and due to the concave periphery of the slicing gang, the high points 84 pass close to each knife in the slicing gang, the clearance between the high points of the cube cutter 80 and the peripheries of the knives in the gang 70 being very small and uniform.

The knives 81 are also arranged helically with respect to the shaft 90 (Fig. 6). Each knife is secured by bolts 85 to a flange 86 on a ring 87. The three flanges 86 (Fig. 9) are disposed helically on the ring 87. The ring 87 is welded to a wheel 91 (Fig. 6) that is keyed to the end of shaft 90. The shaft is supported in bearings such as 92 in a cylindrical housing 93 secured to the frame of the machine. At its other end the shaft 90 is provided with a pulley 94, which is driven by a belt 95 from a similar pulley 96 (Fig. 1) on the armature shaft of motor 12.

To guide the strips of material from the gang of slicing knives 70 to the cube cutter 80, a stripper 75 (Fig. 6) is provided. The stripper is secured to the frame of the machine, as indicated at 76, and has a plurality of fingers which project horizontally in between the circular knives of the gang 70. The inner ends of the strippers are formed arcuately, as at 77, to provide a closure fit with the spacer discs 78. Each stripper has an inclined edge 79 which leads to a throat formed between the bottom edge 101 of the stripper and the horizontal portion 65 of the bottom of the trough 60. As can be seen in Fig. 1, the bottom surface of each stripper finger is horizontal and the fingers are arranged in an arc concentric with shaft 90, surface 101 being substantially the same distance from the shaft 90 as 102, and these bottom surfaces are slotted along an arc concentric with shaft 90, the arcuate slot appearing at 103 in Fig. 6. It will be understood that each finger of the stripper 75 is slotted so as to provide a continuous arcuate slot to receive the high points 84 of the cube cutter knives.

This portion of the mechanism has been enlarged in Fig. 8, where it will be seen that the slot 103 admits the high point 84 of the cube cutter knife 81 and that the high point 84 passes close to the periphery of the slicing knife 71. Only the high point 84 of the knife 81 enters the slot 103. Neither the low point 82 nor the intermediate points of the knife enter the slot, as can be seen in Fig. 10, where the successive points for various angular positions with respect to the axis of shaft 90 are shown.

The slabs of material which descend from the slabbing knives in the vertical chute down into the trough 60 (Fig. 6) are received and guided thereby downwardly along the curved bottom into the gang of slicing knives 70, which are rotating in the direction of the arrow 110. In Fig. 8 a slab of material, indicated at 111, is shown entering the gang of slicing knives. As the knife cuts into the slab 111 it draws it downwardly along the curved bottom of the trough 60 over the slot 66, where the knife cuts clear through the slab, the sliced strip being indicated at 112. Due to the fact that the cutting edges of the knives are ground to a taper, the slice 112 is wedged in between the knives and is carried around thereby to the position indicated at 113. It will be noted that the knives, after cutting through the slab, carry the slices up off the floor of the trough and into engagement with the stripper 75. Should there be another strip of material on top of the strip 112, it engages the inclined edge 79 of the stripper, which retards its feed until the strip 112 has been drawn out from under it, when the inclined edge 79 will guide the upper strip down into the throat.

The strip of material indicated at 113 (Fig. 8) has entered the throat and has been carried by the knives into contact with the under surface 101 of the stripper. As the knives continue to rotate, the strip of material will be fed thereby along the surface 101 and presented to the cube cutter, in the position indicated at 114. Due to the rotation of the slicing knives, the strip 114 is held in contact with the under the surface 101 of the stripper and is fed outwardly along this surface. The surface 101 is made perpendicular to the plane of the cube cutter so that the cut of the knife 81 will be at right angles to the length of the strip. Furthermore, due to the fact that the strip 114 is still wedged in between the knives of the slicing gang, it is prevented from moving laterally, and as can be seen in Fig. 1, the strip is fed out through a channel, the top of which is the under side of the stripper, and the two side walls of which are the circular knives. As the strips of material emerge from these channels cubes are cut from them by the cube cutter.

The cube cutter is designed to bring its cutting edges as close as possible to the edges of the knives in the slicing gang to take full advantage of the fact that the material is being held against lateral displacement because it is wedged between the slicing knives. It has already been explained that the periphery of the slicing gang is concave to fit the circular path 120 (Fig. 13) of the high points 84 of the cube-cutter knives. In addition, the intermediate points (Fig. 10) are brought as close as possible to the slicing knives.

I have found that there are a number of ways in which this result can be obtained. The method which I have chosen for illustration herein has the advantage that it is simple to manufacture. It comprises making the major portion of the cutting edge from point 83 (Fig. 13) to point 84, the arc of a circle described from a center 121 which is spaced from the center 122 of the cube cutter 80, so that the arc is eccentric with respect to the axis of rotation. The remainder of the cutting edge from point 82 (Fig. 12) to point 83, is an arc of short radius. In Fig. 13, radii were drawn from center 122 at the angular positions indicated, to obtain the polar coordinates of several points on the cutting edge. These coordinates were then used to locate the corresponding points in Fig. 10, which shows their location with respect to the circular slicing knife 71, as they come into the plane thereof. The points were then joined by a curve representing their locus.

It will be observed in Fig. 10 that in the first ten degrees of rotation of the cube-cutter, the cutting edge moves rapidly in toward the periphery of slicing knife 71 from point 82 to point 83, and that thereafter the cutting edge follows along the periphery of 71 until, as it approaches the cut off slot 103, it is advancing tangentially to the periphery of 71.

The short radius arc 82—83 (Fig. 12) is an important feature of the knife, because it enables the knife to cut into the strip of material 114, as indicated by the dotted arc 125 before the end of the preceding knife has disengaged the strip, there being a portion 126 of the end of the strip abutting the knife at this time. If, for example, the long radius portion of the knife began at 82, thus dispensing with the short radius portion, then the slicing gang would tend to feed the strip 114 out as soon as the end of the preceding knife had passed away. This would leave an open channel from which the material could be fed before the cube-cutter knife engaged it, and the result would be that the pieces cut would not be cubical, but elongated.

Another reason for employing the short radius portion 82—83 to cause the knife edge of the cube cutter to quickly advance toward the periphery of the slicing gang is that the slices emerging from the gang are not always perfectly square in cross-section. In dicing pears, for example, due to the irregular contour of the fruit, there are strips cut from the outside which are irregular in cross-section and of less cross-sectional area than the square sections. The short radius portion 82—83 of the knife in quickly approaching the periphery of the gang prevents such strips from escaping as long slivers before they can be engaged by the cube cutter. Consequently, by providing the short radius arc at the beginning of the cutting edge, the material is always under the feeding control of the cube cutter.

The advance of the cutting edge through the material is shown diagrammatically in Fig. 11, where it will be observed that in the first ten degrees of rotation, the short radius arc has progressed rapidly across the bottom edge of the strip in order to get a firm grip on the material, and to prevent the feed of the slicing gang from shearing the strip of material lengthwise on the knife 81. The feeding power of the slicing knives is considerable, and as soon as a cube is cut from the strip of material and the high point 84 uncovers the channel out of which the material is being forced, the end of the strip is free from restraining pressure, and there is only the engagement of the next knife with the material to oppose it. In Fig. 12, for example, if the high point of the preceding knife were not present at this instant, the strip would tend to shear or break down along the line 125 due to the feeding power of the slicing knives which is exerted in a direction toward the reader. All that would be opposing this force would be the cross sectional area 127 (which has been cross-hatched) on the lower righthand corner of the strip.

However, due to the short radius curve 82—83, by the time the high point 84 has released the strip 114, the next blade 81 has cut across the bottom of the strip. As can be seen in Fig. 11, the cut proceeds first across the bottom of the strip and then rises vertically at a slicing angle. Aside from the importance of obtaining as large a cross-sectional engagement as possible at the beginning of the cut, there is the added importance of engaging the material on the fourth or bottom side. Reference to Fig. 8 will show that the bottom of the strip 114 emerges from between the slicing knives first. This is an advantage in that while the two vertical sides of the material are being gripped by the slicing knives, and while the third or top side is confined by the stripper 75, the fourth side is exposed for cutting by the cube-cutter knife 81. However, for this very reason the knife 81 must quickly cut across and into the fourth side of the material, because the moment the material emerges from the slicing knives, it ceases to be supported thereby.

The diagrams, Figs. 2 to 5, illustrate how the cube-cutter feeds the material as it cuts off the cubes. In Fig. 2, the high point 84, having just cut off a cube, is acting as a gauge for the cut of the next knife, because the end of the strip 114 is abutting against the side of the knife. In Fig. 3, the next knife is beginning its cut.

In the position illustrated in Fig. 4, the knife 81 is cutting deeper into the material, and due to its helix, is feeding the strip 114 away from the slicing gang 70. Note that the end of the strip 114 has now passed beyond the slot 103 and the flange 86 is in a different position with respect to the ring 87 in Fig. 4 than in Fig. 3. Thus the knife 81 cuts as it feeds until, as shown in Fig. 5, its high point 84 enters the slot 103, completely severing the cube 115 on the shearing edge of the slot. This cycle is repeated, beginning again with Fig. 2, as each knife 81 comes into operation. The cube 115 drops off the knife 81 into a discharge spout 116 (Fig. 6).

There is no intricate timing of parts anywhere in the machine, so that the slipping of a gear or the twisting of a shaft cannot affect the operation of the machine as a whole. It will be noted that all of the knives of the machine are given firm support so that they have great strength and rigidity and are not apt to break easily. The knives themselves act to feed the material from one end of the machine to the other, the strippers being used to guide the material off one set of knives and into the next, so that no supplementary feeders or conveyors are required.

In fact, the knives are the only moving parts in the food handling machinery. They are so arranged in a stationary conduit that the rotation of the knives with the aid of gravity is sufficient to feed the material through the machine. This conduit consists of a vertical chute communicating at its lower end with a downwardly-extending trough. The slabbing knives cut the material into slabs as it descends the chute; the slicing knives cut the slabs into strips as the material moves down the trough; and the cube cutter, located at the bottom end of the trough, cuts the strips into cubes as the material leaves the lower end of the conduit.

While I have described a particular embodiment of the present invention, it will be obvious that various changes and modifications may be made in the details thereof without departing from the spirit of the present invention and the scope of the appended claims.

Having thus described my invention and in what manner the same may be used, what I claim as new and desire to protect by Letters Patent is:

1. In a machine for cutting food material into cubes, a plurality of rotary circular slicing knives having tapered edges, spacer discs between said knives, a stationary plate having slots therein, said knives projecting into said slots, a stationary stripper between adjacent knives, said stripper having a portion thereof spaced apart from said plate and another portion disposed adjacent said spacer, the space between said plate and said stripper constituting the outlet for the material, said outlet being only large enough to permit the slices to emerge one at a time, and a knife having a spiral-shaped cutting edge arranged helically with respect to the axis of rotation of said knife and movable across said outlet to cut each slice, the direction of the cut being substantially normal to the surface of said stripper with which the slice is in engagement, said stripper providing a shearing edge for said knife to complete the cutting of the cube from the slice.

2. In a machine for dicing food material, a stationary trough having an opening in one end to receive slabs of material, a gang of slicing knives in said trough, said trough having slots to receive the cutting edges of said slicing knives, said trough having an outlet, a cube cutter having a spiral-shaped knife edge arranged helically with respect to the axis of rotation of said cutter and movable across said outlet, and a stationary stripper extending past said cutter into said outlet to remove slices of material from said slicing knives, said stripper having parallel flat surfaces against which the slices are pressed by the rotation of said slicing knives as the slices are removed therefrom by said stripper, one face of each slice being thereby placed in contact with one of said flat surfaces, each of said surfaces being disposed with respect to said cube cutter to position the slice so that when said knife edge moves across said outlet the plane of the cut will be perpendicular to the face of the slice in contact with said stripper and the direction of the cut will be substantially normal to said stripper surface whereby said stripper serves to back up each slice as it is being cut by said cube cutter.

3. In a machine for cutting food material, a gang of slicing knives, the diameters of said knives being graduated to give said gang a concave periphery, a stripper having fingers extending into said gang between said knives, a rotary cube cutter having a plurality of knives, each of said cube-cutter knives having a high point disposed at a greater radial distance from the axis of rotation of said cube cutter than other points in said knife, said high points lying in a circle concentric with the axis of rotation of said cube cutter and conforming with said concave periphery of said gang, and material-engaging surfaces on said stripper fingers disposed equidistance from said axis and parallel thereto.

4. In a machine for cutting food material, a gang of slicing knives mounted on a shaft, the diameters of said knives being graduated to give said gang a concave periphery, a stationary stripper having fingers extending into said gang between the knives thereof, a cube cutter mounted on a second shaft, the axis of said second shaft being normal to a plane containing the axis of said first shaft, a plurality of knives on said cube cutter, the cutting edge of each of said knives being arranged helically with respect to the axis of said second shaft, said cutting edge having a high point disposed at a greater radial distance from the axis of said second shaft than other points in said cutting edge, said stripper fingers having material-engaging surfaces disposed substantially parallel to and equidistant from said axis of said second shaft and having an arcuate slot cut therein to receive the high points of said cube-cutter knives said slot being concentric with said axis of said second shaft and conforming to said concave periphery of said gang of slicing knives.

5. In a machine for cutting food material, a trough, a gang of rotary slicing knives therein, said trough having a wall with slots therein to receive the peripheries of said knives to provide shearing edges therefor, a stationary stripper having fingers projecting in between said knives and spaced apart from said wall a distance only sufficient to admit one strip at a time between each finger and said wall, said fingers being so disposed with respect to said knives that upon rotation of said gang said knives will feed the strips of material which they have cut onto said fingers and then along said fingers, and a rotary cube cutter, the axis of rotation of said cube cutter being normal to a plane containing the axis of rotation of said gang of rotary slicing knives, said cube cutter having helically arranged cutting edges disposed with respect to said slicing knives and said fingers so as to take over the feeding of said strips from said slicing knives and to continue feeding said strips along said fingers as said cube cutter cuts cubes from said strips.

6. In a machine for cutting food material, a plurality of parallel knives movable in unison, said knives having tapered edges which slice the material and cause the slices to be wedged between said knives, two opposite sides of each slice being in contact with the sides of the knives adjacent thereto after the strip has been severed, a stationary stripper having a finger inserted between said adjacent knives to engage a third side of the strip of material while the said two sides of the strip are still in engagement with said knives, and a cube cutter disposed adjacent said stripper and said slicing knives and having a spiral-shaped cutting edge arranged helically with respect to the axis of rotation of said cutter and adapted to cut into the fourth side of the strip of material while its other three sides are in engagement with said stripper and said knives.

7. In a machine for cutting food material, a gang of spaced apart knives for cutting a slab of material into a plurality of elongated slices, said gang of knives having a concave periphery and a cube cutter comprising a rotatable wheel having a knife edge helically disposed with respect to the axis of the wheel which cuts cubes from the slices of material cut by said slicing knives while the slices are transversely supported by said slicing knives, said cube cutter and said slicing knives being disposed with respect to each other so that the path of rotation of said cube cutter knife edge extends within the concave depression formed by the periphery of said gang of knives and so that the plane of rotation of said wheel intersects each of said slicing knives and said cube cutter cuts across the slices transversely of their length.

8. In a machine for cutting food material, a gang of rotary slicing knives having graduated diameters to give the gang a concave periphery, and a rotary cube cutter having a knife edge the end of which is farther from the axis of rotation of said cube cutter than the beginning, said knife edge being disposed so that said end passes close to and equidistance from the concave periphery of said gang of slicing knives.

9. In a machine for cutting food material, a gang of concentric slicing knives of different diameters, said knives being arranged to give said gang a concave periphery, a rotary cube cutter, and a stripper to transfer material from said slicing knives to said cube cutter, said stripper having an arcuate slot to receive the cutting edge of said cube cutter, the arc of said slot being concentric with said cube cutter and conforming to the concave periphery of said gang.

10. In a machine for cutting food material, a plurality of spaced apart knives operable to slide a slab of material into strips, a stationary stripper associated with said knives, said knives carrying the slices into contact with a surface of said stripper and causing the strips to slide along said surface and a cube cutter having a cutting edge arranged helically with respect to the axis of the cutter to cut cubes from the strips of material as the strips are sliding along said surface of said stripper and while the strips are held between said slicing knives said stripper surface being positioned substantially normal to the direction of cut of said cutting blade and said surface being in supporting engagement, during cutting, with the side of the strip opposite the side from which the strip is cut by said blade 11. In a machine for cutting food material, a vertical chute in which the material is deposited, two coopertaing gangs of circular slabbing knives, corresponding knives in the two gangs lying in the same plane with the cutting edges thereof in opposed relation inside said chute, means to rotate said gangs in opposite directions so that at the point of opposition of the cutting edges the cutting edges are moving downwardly, a trough connected to the lower end of said chute to receive slabs of material therefrom, said trough extending downwardly and having slots therein, a gang of circular slicing knives in said trough, the cutting edges of said knives projecting into said slots, means to rotate said gang of slicing knives so that the cutting edges thereof move downwardly into said slots, and a cube cutter at the bottom end of said trough having a helical knife which feeds the material out of the machine as it cuts the strips into cubes.

12. In a machine for dicing food material, said machine having means for cutting the material into slabs; a plurality of spaced-apart knives, means movable to cause said knives to slice the slabs into strips, a member to position the strips after they have been cut by said slicing knives, said member having slots, said knives projecting into said slots, and a rotary knife having a curved cutting edge disposed helically with respect to the axis of rotation of said knife, said knife being operable to cut the strips into cubes while the strips are in contact with said member and to feed the strips away from said slicing knives as said knife cuts the strips into cubes.

13. In a machine for cutting food material, a plurality of discs having peripheral cutting edges, a stripper between adjacent discs having a surface for engaging the pieces of material after they have been cut by said discs and for removing them therefrom, and a rotary knife having a spiral-shaped cutting edge arranged helically with respect to the axis of rotation of said knife, a portion of said surface being substantially parallel to the axis of rotation of said knife and in supporting engagement with the side of the piece opposite the side from which the piece is cut by said rotary knife, said portion of said surface having an edge beyond which a portion of the cutting edge of said rotary knife passes.

14. In a machine for cutting food material, a plurality of slicing knives, a stripper between adjacent knives having a surface for engaging the slices of material and for removing them from said knives, and a cube cutter having a knife edge disposed helically with respect to the axis of rotation of said cube cutter, a portion of said stripper surface being disposed with respect to the path of said knife edge so that said knife edge will feed each slice along said stripper as said knife edge cuts a cube therefrom.

15. In a machine for cutting food material, a plurality of movable slicing knives, a stationary stripper extending in between adjacent knives and in beyond the cutting edges thereof for engaging the slices of material cut thereby, and a cube cutter having a spiral-shaped helically arranged cutting edge, said cutter being operable to move said cutting edge through the slices in a direction substantially normal to the surfaces of said stripper with which the slices are in engagement to cut cubes from each slice while it is in engagement with and supported by said stripper.

16. In a machine for cutting food material, a plurality of movable slicing knives, a stationary stripper extending in between adjacent knives and in beyond the cutting edges thereof, said stripper having a surface for engaging the slices of material, and a cube cutter having a spiral-shaped helically arranged blade, a portion of said stripper surface being disposed with respect to the blade of said cube cutter so as to position and support the slices for cutting into cubes by engaging the side of the slice opposite the side from which said cube cutter cuts.

17. In a machine for cutting food material, a plurality of slicing knives, a plurality of strippers therefor, each of said strippers having a surface for engaging the slices of material while they are in contact with said knives, and a cube cutter having a plurality of knives disposed helically with respect to the axis of rotation of said cube cutter, each of said knives having a high point, a portion of each of said stripper surfaces being arranged to present the slices of material at a right angle to said knives, said portion having a slot to receive the high point of each knife edge, said portions of said stripper surfaces being arranged in an arc, the center of said arc being coincident with said axis.

18. In a machine for cutting food material, a gang of rotary knives adapted to receive a plurality of slabs of material and cut said slabs into a plurality of superimposed elongated slices of substantially uniform thickness, a plate having slots to receive the cutting edges of said knives, and a stripper projecting in between adjacent knives, said stripper having a material-engaging surface converging toward said plate to provide therewith a passage between adjacent knives the entrance of which is wide enough to receive a plurality of said superimposed slices and the outlet of which, where the slices emerge from between the knives is wide enough to pass the slices one at a time but narrow enough to prevent the continual passage during operation of one slice of material superimposed upon another slice of material.

19. A machine for dicing food material, comprising in combination means to cut the material into slabs, a downwardly-extending trough to receive the slabs of material therein with their cut faces in face to face relationship, a gang of slicing knives to cut the slabs of material while in said face to face relationship into superimposed strips as the material descends said trough, a rotary cube cutter at the bottom end of said trough to cut the strips into cubes, and stripper means to conduct the superimposed strips from each pair of slicing knives to said cube cutter, said stripper means being positioned in said trough to provide a restricted throat between each pair of knives wide enough to allow the passage of said superimposed strips one at a time to said cube cutter but small enough to prevent the continual passage during operation of one strip superimposed on another.

20. In a machine for dicing food material, a plurality of circular rotary knives having tapered cutting edges whereby the strips of material are cut and then wedged between the knives and carried around therewith, a stripper to engage the strips of material and guide them toward the periphery of said knives, a rotary cube cutter having a knife edge disposed thereon so that the beginning of said knife edge is nearer the axis of rotation of said cube cutter than the end thereof and so that said beginning and said end lie in spaced apart planes normal to said axis, said knife edge having a contour such that upon rotation of said cube cutter the knife edge will first rapidly approach the periphery of said circular knives and then throughout the major part of its length follow along said periphery until the end of said knife edge reaches said stripper.

21. In a machine for cubing food material, a gang of rotary slicing knives for slicing slabs of material fed thereto, a stripper for directing material from between said gang of knives, and a helical knife positioned with its periphery adjacent said gang of knife peripheries to cut the strips of material from said gang into cubes and control the longitudinal delivery speed of said strips while cutting said cubes.

22. In a machine for cutting food products, a plurality of slabbing knives for cutting the product into a plurality of longitudinal slabs simultaneously, a trough for receiving said slabs with their cut faces in face to face relationship, a plurality of parallel rotary slicing knives for cutting said longitudinal slabs while in said face to face arrangement into a plurality of superimposed longitudinal slices, and means including a stripper between adjacent slicing knives and a confining wall spaced therefrom on the same side of the axis of said slicing knives as said stripper, to form a restricted passageway with said slicing knives to remove the superimposed slices one at a time from between adjacent slicing knives.

23. In a machine for dicing fruit and vegetable material, a rotary cube cutter, and means for simultaneously feeding a plurality of strips of material of substantially square cross section to the periphery of said cube cutter for cutting into cubes, the periphery of said cube cutter being provided with a plurality of knives angularly disposed with respect to the axis of rotation of said cube cutter, each of said knives having a cutting edge, the cut starting end of which is nearer the said axis than the cut finishing end thereof, each knife also having a substantially minor portion of its cutting edge at the cut starting end thereof lying in a sharp curve and having a quick rise with respect to the axis of said cutter and having a connecting cutting edge portion extending over the greater length of said cutting edge, which connecting portion lies in a long curve of slow rise with respect to said axis, the cut starting end of one knife being disposed adjacent the cut finishing end of the preceding knife whereby the cut starting end is engaged with the material to be cut before the adjacent cut finishing end has passed out of engagement therewith and whereby the latter serves to gauge the starting cut and aids in supporting the material during the initial engagement therewith of the cut starting end of the knife.

24. In a machine for cutting fruits and vegebles the combination of a rotary cutter and a stationary member having a surface for backing up the material to be cut, said cutter having a cut starting knife edge portion disposed nearer the axis of rotation of the cutter than a cut finishing portion thereof, and having said cut starting portion and cut finishing portion lying in spaced apart planes normal to said axis, said cut starting knife edge portion being formed of a sharp curve turning in toward said axis and having a quick rise with respect to said axis and said cut finishing portion being formed of a long curve of slow rise with respect to said axis; said cutter having cut starting and cut finishing portions disposed adjacent each other whereby a part of said cut starting portion is engaged with the material to be cut before the end of the adjacent cut finishing portion has passed out of engagement with the material, and whereby the latter serves to gauge the starting cut and aids in supporting the material during the initial engagement of the cut starting end of the knife, and said backing surface being positioned on both sides of the line of cut whereby to back up the material during the entire cutting operation.

ALBERT R. THOMPSON.

CERTIFICATE OF CORRECTION.

Patent No. 2,318,904.   May 11, 1943.

ALBERT R. THOMPSON.

It is hereby certified that error appears in the printed specification of the above numbered patent requiring correction as follows: Page 3, first column, line 74, before "surface" delete the word "the"; page 5, second column, line 57, claim 10, for "slide" read --slice--; and that the said Letters Patent should be read with this correction therein that the same may conform to the record of the case in the Patent Office.

Signed and sealed this 12th day of October, A. D. 1943.

(Seal)

Henry Van Arsdale,
Acting Commissioner of Patents.